(12) United States Patent
Nakazato et al.

(10) Patent No.: US 6,860,812 B2
(45) Date of Patent: Mar. 1, 2005

(54) VIDEO GAME HAVING SMOOTH CHARACTER CONTROL

(75) Inventors: Takayoshi Nakazato, Tokyo (JP); Koji Sugimoto, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 46 days.

(21) Appl. No.: 09/973,120

(22) Filed: Oct. 10, 2001

(65) Prior Publication Data

US 2002/0142837 A1 Oct. 3, 2002

(30) Foreign Application Priority Data

Mar. 29, 2001 (JP) ........................................ 2001-095450

(51) Int. Cl.⁷ ................................................ A63F 9/24
(52) U.S. Cl. ........................................ 463/30; 463/36
(58) Field of Search ........................ 463/30–34, 36–38; 345/418, 419, 619, 473, 474, 475

(56) References Cited

U.S. PATENT DOCUMENTS 5,261,820 A * 11/1993 Slye et al. ...................... 463/1
5,779,548 A *  7/1998 Asai et al. ..................... 463/31
6,126,545 A * 10/2000 Takahashi et al. ............ 463/32

FOREIGN PATENT DOCUMENTS

| JP | 2000-24306 | 1/2000 |
| JP | 2000-132705 | 5/2000 |
| JP | 2001-269482 | 10/2001 |

OTHER PUBLICATIONS

English Language Abstract of JP 2000–132705.
English Language Abstract of JP 2001–269482.
English Language Abstract of JP 2000–24306.

* cited by examiner

*Primary Examiner*—Mark Sager
(74) *Attorney, Agent, or Firm*—Greenblum & Bernstein, P.L.C.

(57) ABSTRACT

A video game program enables smooth movement of a character while simplifying an operation. The video game program causes a computer to: always detect an angle θ formed by a line of sight of a camera and a direction of a player character. If a player operates a direction key, the computer corrects an input direction received by the operated direction key with the angle θ and generates the corrected direction, as a progress direction of the player character. The computer further stores this generated progress direction in a storage area and moves the player character in the direction. If operation of a key part of an identical direction is continued in the direction key, the computer moves the player character in the stored progress direction regardless of whether the line of sight moves. Therefore, the player character continues to move in the identical direction in the three-dimensional space even if a camera angle changes.

3 Claims, 6 Drawing Sheets

| OPERATION OF KEYPAD | INTERVAL PATH |
|---|---|
| (a)  |  |
| (b)  |  |

PRIOR ART

VIDEO GAME HAVING SMOOTH CHARACTER CONTROL

CROSS REFERENCE TO RELATED APPLICATION

The present application relates to subject matter contained in Japanese Patent Application No. 2001-095450, filed Mar. 29, 2001, the disclosure of which is expressly incorporated by reference herein in its entirety.

BACKGROUND OF THE INVENTION

1. Field of the Invention

The present invention relates to video games. More particularly, the present invention relates to a video game program for displaying a virtual three-dimensional space while causing a line of sight to change and at the same time displaying a character on a screen and causing the character to move in the three-dimensional space based on a direction input by a direction key to be operated by a player.

2. Description of the Related Art

Conventionally, in a video game such as a role playing game (hereinafter referred to as RPG), a game program displays a virtual three-dimensional space viewed along a certain line of sight on a screen and at the same time displays a player character in this three-dimensional space. Then, when the player operates a direction key that is composed of up, down, left and right key parts, the game program causes the player character to move in the three-dimensional space based on a direction input by the direction key.

That is, as shown in FIG. 5, the game program displays a virtual three-dimensional space image viewed along a virtual camera C's line of sight I on a screen and always detects an angle $\theta$ formed by the camera C's line of sight I and a direction line D that is an orientation of a player character P as well. Then, when a direction key is operated by a player or during operation, the game program corrects an input direction indicated by the operated direction key by the angle $\theta$ and regards this as a progress direction of the player character P to cause the player character P to progress in this direction.

That is, when the line of sight I is changed by a directional change of the virtual camera C, the angle $\theta$ changes following the change of the line of sight I. Thus, the direction input by the direction key K is corrected by this angle $\theta$. It is therefore possible to automatically cause left and right directions of the direction key K and left and right directions of the three-dimensional space as well as up and down of the direction key K and direction of approaching and going away from the camera in the three-dimensional space to coincide with each other, respectively. Thus, if the right direction is input by the direction key K, the player character P moves in the right direction in the virtual three-dimensional space and, if the left direction is input by the direction key K, the player character P moves in the left direction in the virtual three-dimensional space.

However, as shown in FIG. 6, an image that is displayed on a screen in a game progress process may switch from a three-dimensional space image (a) photographed by a virtual camera A from the back of the player character P to a three-dimensional space image (b) photographed by a virtual camera B from the front of the player character P. In this case, since a direction of progress (←) of the character is a direction of going away from the camera A in the three-dimensional space image (a), the player is operating a down key part KD in the direction key K.

When the image switches to the three-dimensional space image from the camera B in this operating state, the progress direction (←) of the character turns into a direction of approaching the camera B in the three-dimensional space image. Therefore, in order cause the player character P to move in an identical direction in the three-dimensional space before and after the camera switches from A to B, the player has to stop operating the down key part KD at the time of switching to the image (b) and operate the up key part KU so as to cause the player character P to move in the direction approaching the camera B. As a result, smooth movement of the character becomes hard following the change of the virtual three-dimensional space image displayed on the screen, which is one reason amusement of a video game decreases.

SUMMARY OF THE INVENTION

The present invention has been devised in view of these problems, and it is an object of the present invention to provide a video game program for enabling smooth movement of a character while simplifying an operation, a recording medium having the video game program recorded therein, a method of controlling movement of a character in a video game and a game apparatus.

In order to solve the above-mentioned problems, according to a first embodiment of the present invention, a video game program for causing a computer to execute a video game for displaying a virtual three-dimensional space while causing a line of sight to change and at the same time displaying a character on a screen and causing the character to move in the three-dimensional space based on a direction input by a direction key to be operated by a player is provided, wherein the video game program causes a computer to execute a generating procedure for, when the direction key is operated by the player, correcting the input direction by an angle with which the direction of the character and the line of sight cross each other to generate an obtained direction by the correction as a progress direction of the character in the three-dimensional space; a first character movement controlling procedure for causing the character to move in the progress direction generated by the generating procedure in the three-dimensional space; a storing procedure for causing storing means to store the progress direction of the character generated by the generating procedure; a determining procedure for determining whether or not an identical direction is input from the direction key continuously; and a second character movement controlling procedure for, if it is determined by the determining procedure that an identical direction is input from the direction key continuously, causing the character to move in the progress direction stored in the storing means in the three-dimensional space regardless of the movement of the line of sight.

Therefore, the computer executes processing in accordance with this video game program, whereby, when the direction key is operated, the direction obtained by correcting the input direction by the angle with which the direction of the character and the line of sight cross each other is generated as the progress direction of the character in the three-dimensional space. Then, the character is moved in this generated progress direction and this progress direction is stored in the storing means.

In this state, when the line of sight changes, a display state of the three-dimensional space image displayed on the screen also changes accordingly. However, if an identical direction is input from the direction key continuously, the character is moved in the progress direction stored in the storing means in the three-dimensional space regardless of the movement of the line of sight.

Therefore, if an identical direction is input from the direction key continuously, the character continues to move in the identical direction in the three-dimensional space even if the display state of the three-dimensional space image changes following the movement of the line of sight. Thus, even if a virtual three-dimensional space image to be displayed on the screen changes, a smooth movement of the character in the identical direction is possible without operating the direction key anew, whereby amusement of the video game can be increased.

In addition, according to a second embodiment of the present invention, the video game program causes the computer to read a program recorded in a recording medium, whereby effects similar to those described in the first embodiment of the present invention can be obtained. In addition, in a third embodiment of the present invention, the video game program causes the computer to execute processing in steps to be described, whereby effects similar to those described in the first embodiment of the present invention can be obtained. Therefore, processing steps to be described are executed using hardware such as a general-purpose computer and a general-purpose game apparatus, whereby a command display technology of the present invention can be easily implemented by the hardware.

In addition, according to a fourth embodiment of the present invention, effects similar to those described in the first embodiment of the present invention can be obtained as a game apparatus.

Other objects and advantages besides those discussed above shall be apparent to those skilled in the art from the description of a preferred embodiment of he invention which follows. In the description, reference is made to accompanying drawings, which from a part hereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Embodiments of the present invention will be hereinafter described with reference to the accompanying drawings. Further, in the following descriptions, the case in which the present invention is applied to a game machine for home use is explained.

Figure 1:
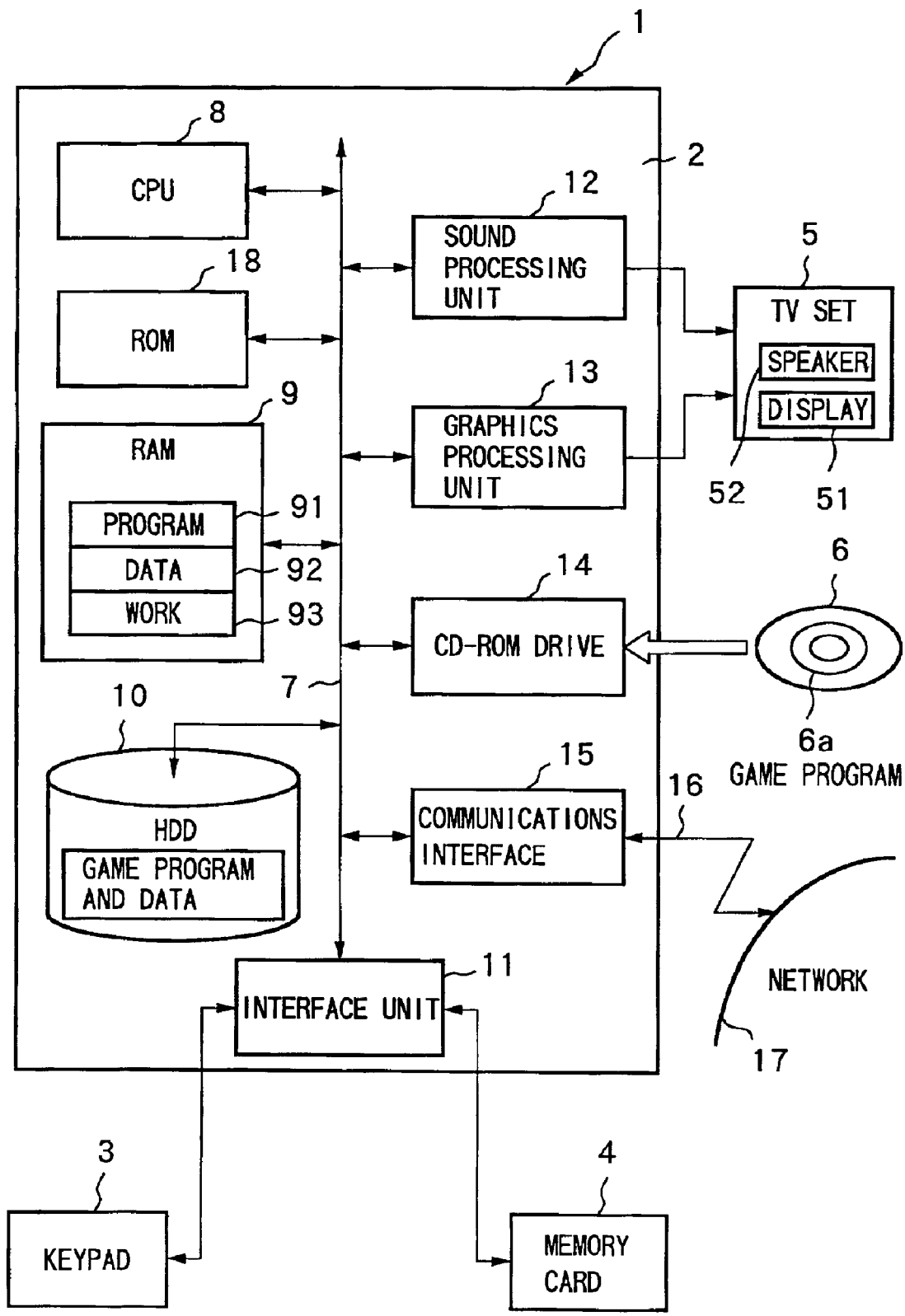
FIG. 1 is a block diagram showing an overall configuration of a game apparatus to which an embodiment of the present invention is applied.

FIG. 1 is a block diagram showing a configuration of a game apparatus in accordance with this embodiment of the present invention. As shown in the figure, this game apparatus 1 includes, for example, a game machine main body 2, a keypad 3, a memory card 4, a TV set 5 and a CD-ROM 6.

The game machine main body 2 is composed of, for example, a CPU 8 (Central Processing Unit), an ROM (Read Only Memory) 18, a RAM (Random Access Memory) 9, an HDD (Hard Disk) 10, an interface unit 11, a sound processing unit 12, a graphics processing unit 13, a CD-ROM (Compact Disc Read Only Memory) drive 14, a detachable CD-ROM 6 and a communications interface 15, which are connected to each other via a bus 7.

The CPU 8 sequentially executes a program stored in the RAM 9 to perform processing for progressing a game based on a basic program such as a boot program and an OS (Operating System) stored in the ROM 18. In addition, the CPU 8 controls operations of each of components 9 to 15 in the game machine main body 2.

The RAM 9 is used as a main memory of the game machine main body 2 and stores a program and data required for progress of a game, which are transferred from the CD-ROM 6. In addition, the RAM 9 is also used as a work area in executing a program. That is, a program storage area 91, a data storage area 92, a work area 93 and the like are allocated to the RAM 9. A program and data to be stored in the program storage area 91 and the data storage area 92 are read from the CD-ROM 6 by CD-ROM drive 14 in accordance with control of the CPU 8 and transferred to the RAM 9. Various kinds of data required during progress of a game are temporarily stored in the work area 93.

A game program and data received from an external network 17 via the communications interface 15 and a communications line 16 are stored in the HDD 10. The detachable keypad 3 and the memory card 4 are connected to the interface unit 11. The interface unit 11 controls exchanges of data between the keypad 3 and the memory card 4 that are in the outside of the game machine main body 2 and the CPU 8 and the RAM 9. Further, the keypad 3 is provided with direction keys and various buttons. A player operates these keys and buttons to execute inputs required for progress of a game, such as an instruction to move and an instruction to operate the player's own character. In addition, the memory card 4 saves data indicating a state of progress of a game.

The sound processing unit 12 performs processing for reproducing sound data such as BGM (Background Music) and sound effects corresponding to a state of progress of a game in accordance with an instruction from the CPU 8 and outputs the sound data to the TV set 5.

The graphics processing unit 13 performs three-dimensional graphics processing in accordance with an instruction from the CPU 8 and generates image data corresponding to a state of progress of a game. The graphics processing unit 13 adds a predetermined synchronization signal to the generated image data to output the data to the TV set 5 as a video signal.

The CD-ROM drive 14 drives the CD-ROM 6 set in the game machine main body 2 in accordance with an instruction from the CPU 8 and transfers a program and data stored in the CD-ROM 6 to the RAM 9 via the bus 7.

The communications interface 15 is connected to the external network 17 via the communications line 16 and performs processing for exchanging a program and data with the external network 17 in accordance with an instruction from the CPU 8.

The CD-ROM 6 stores a program and data (game program 6a) required for progress of a game. The CD-ROM 6 is driven by the CD-ROM drive 14, whereby the stored program and data are read. The program and data read from the CD-ROM 6 are transferred to the RAM 9 from the CD-ROM drive 14 via the bus 7.

The TV set 5 is provided with a display screen 51 consisting of a CRT (Cathode Ray Tube) or the like for displaying an image corresponding to a video signal from the graphics processing unit 13 and a speaker 52 for outputting sounds corresponding to a signal from the sound processing unit 12. Usually, a television receiver is used as the TV set 5.

Figure 2A:
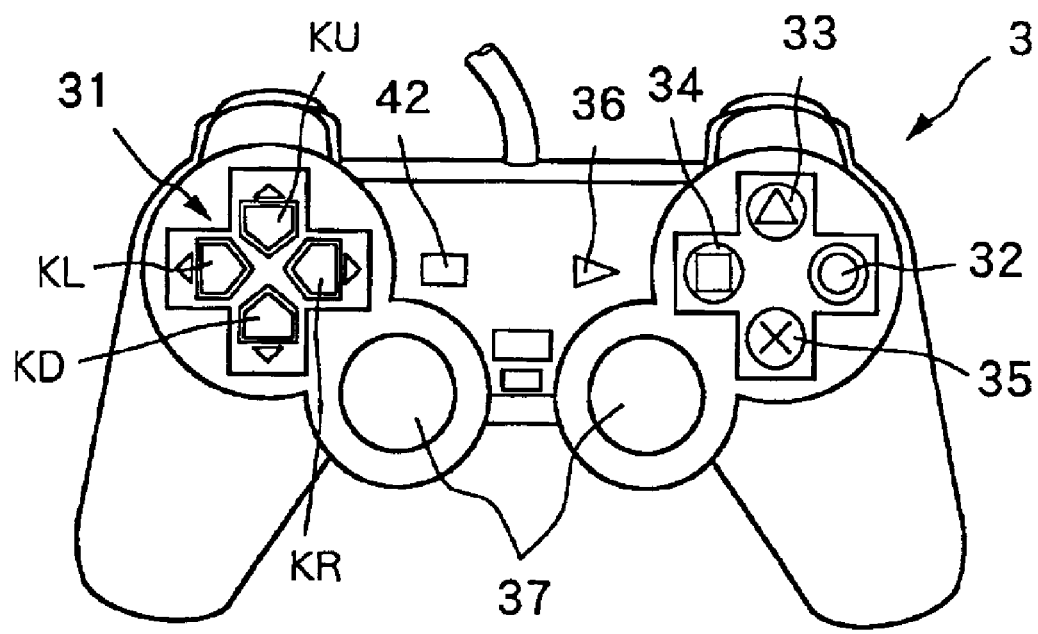
FIG. 2A is a plan view showing a keypad.
Figure 2B:
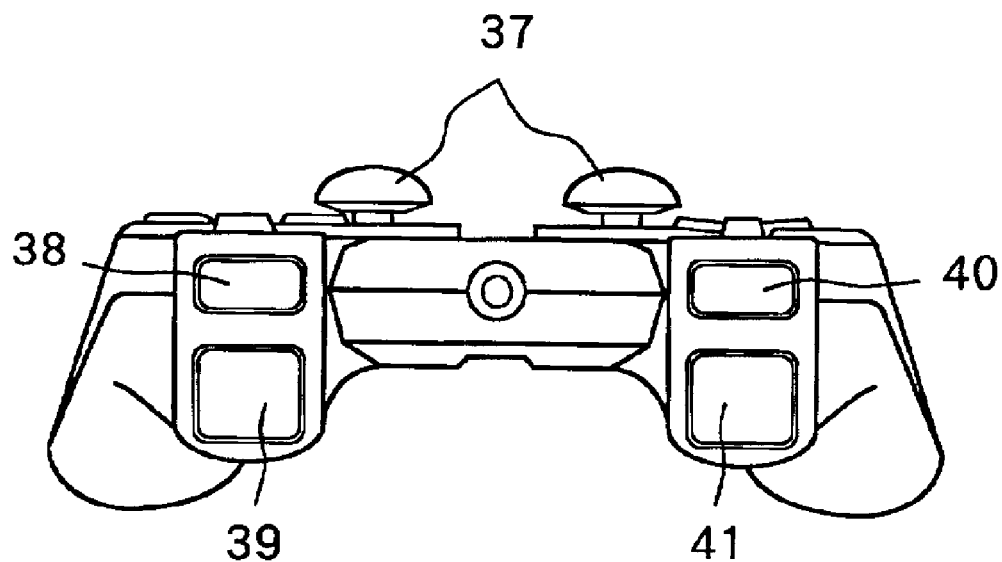
FIG. 2B is a rear elevation showing the keypad.

FIG. 2A is a plan view showing the keypad 3 and FIG. 2B is a rear elevation showing the keypad 3. The keypad 3 is provided with a direction key 31, operation keys (a circular button 32, a triangle button 33, a square button 34, a cross button 35, a start button 36 and a select button 42) for inputting various instructions to the CPU 8 and the like as operating tools. In addition, the keypad 3 is provided with joysticks 37 as an operating tool. A group of keys (an R1 button 38, an R2 button 39, an L1 button 40 and an L2 button 41) are provided on the back of the keypad 3 as operating tools.

The direction key 31 is composed of an up key part KU and a down key part KD as well as a left key part KL and a right key part KR. Moreover, the keypad 3 incorporates a motor, which can start to operate by receiving a predetermined control signal from the CPU 8, thereby casing the entire keypad 3 to vibrate.

In this embodiment in accordance with the above-mentioned configuration, the CPU 8 secures an area for storing information in the RAM 9 when a game is started, whereby a program storage area 91, a data storage area 92, a work area 93 and the like are secured in the RAM 9. Then, upon receiving a game starting request, the CPU 8 reads information required for a game to be started from the CD-ROM 6 into the RAM 9, whereby a game program is stored in the program storage area 91.

Figure 3:
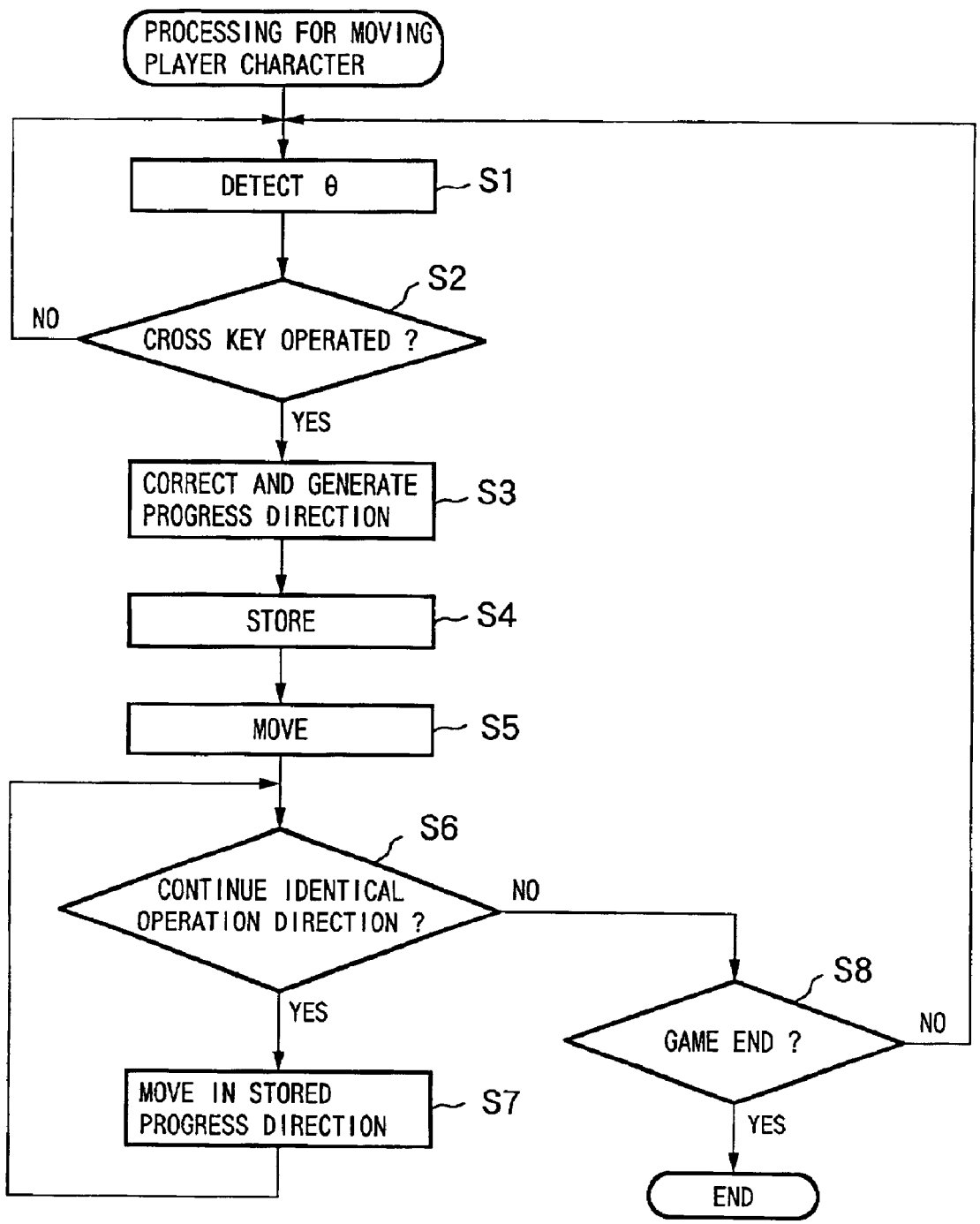
FIG. 3 is a flow chart showing an exemplary procedure for processing movement of a player character.
Figure 5:
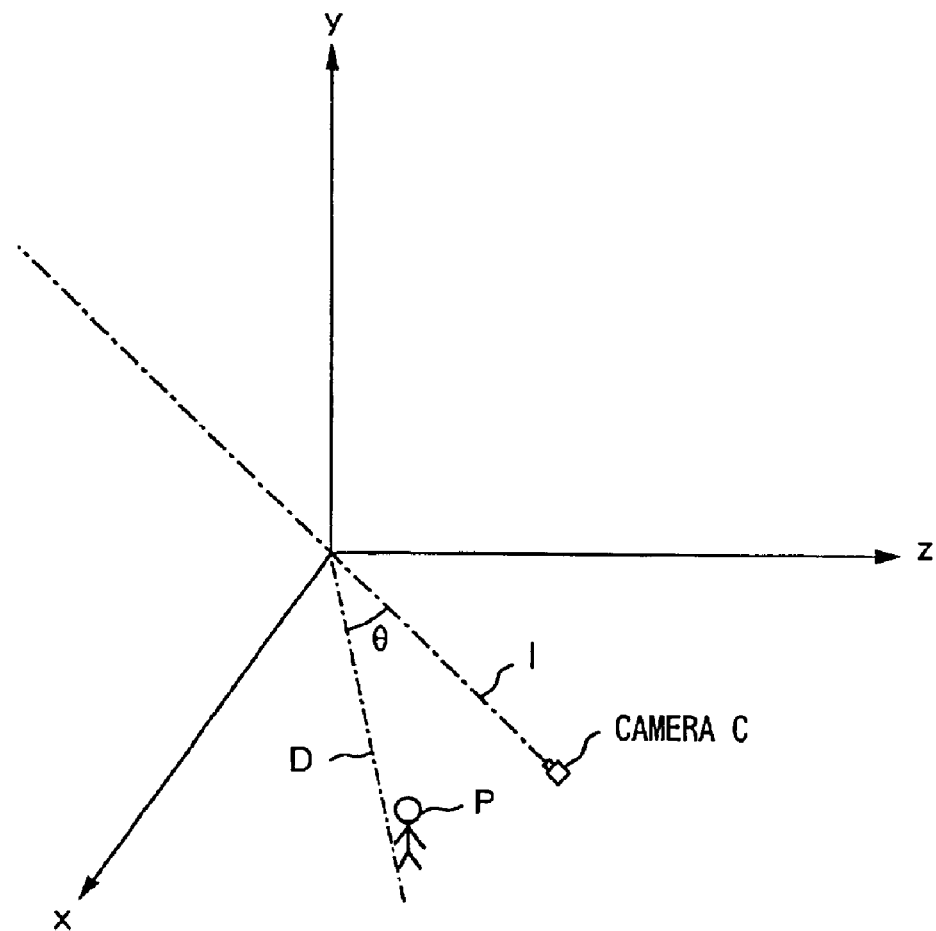
FIG. 5 illustrates details of a procedure for correcting and generating a movement direction.
Figure 5:
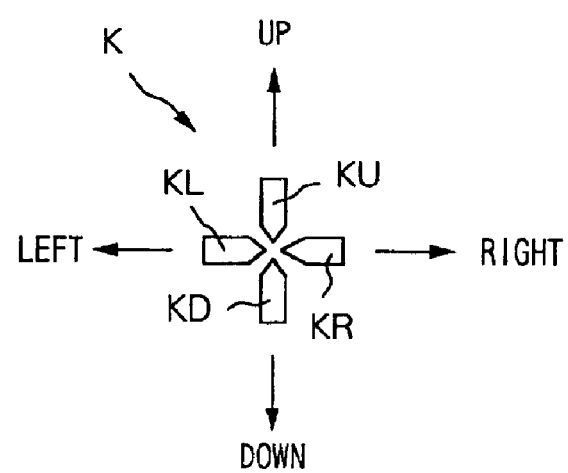

As described above with reference to FIGS. 3 and 5, the CPU 8 causes the display 51 to display a virtual three-dimensional space image viewed along a line of sight I from a virtual camera C based on the game program stored in this program storage area 91. In this display state, the CPU 8 executes processing for moving a player character shown in the flow chart of FIG. 3 and always detects an angle θ formed by the line of sight I of the camera C and a direction line D that is an orientation of a player character P (step S1). Subsequently, the CPU 8 determines whether or not the direction key 31 is operated by a player (step S2). If the direction key 31 is operated, the CPU 8 corrects an input direction shown by the up key part KU, the down key part KD, the left key part KL and the right key part KR of the operated direction key 31 with the angle θ and generates the corrected input direction as a progress direction of the player character P (step S3). Moreover, the CPU 8 causes the data storage area 92 of the RAM 9 to store this generated progress direction of the player character P (step S4).

Subsequently, the CPU 8 causes the player character P to move in the above-mentioned progress direction (step S5). That is, since, when the line of sight I is changed by positional change of the virtual camera C, the angle θ changes following the camera change, and a direction from the direction key 31 is corrected by this angle θ. Thus, it is possible to automatically cause left and right directions corresponding to the left and right key parts KL and KR of the direction key 31 and left and right directions of the three-dimensional space as well as up and down corresponding to the up and down key parts KU and KD of the direction key 31 and direction of approaching and going away from the camera in the three-dimensional space to coincide with each other, respectively. Thus, if the right direction is input by the direction key, the player character P moves in the right direction in the virtual three-dimensional space and, if the left direction is input by the direction key, the player character P moves in the left direction in the virtual three-dimensional space.

In addition, the CPU 8 determines whether or not operation with respect to the key part of the identical direction is continued in the direction key 31 (step S6). Then, if the operation with respect to the key part of the identical direction is continued in the direction key 31 (step S6; YES), the CPU 8 causes the player character P to move in the progress direction stored in the data storage area 92 (by the processing of step S4) in a three-dimensional space regardless of whether the line of sight I moves (step S7). Therefore, if the operation with respect to the key part of the identical direction is continued in the direction key 31, the player character P continues to move in the identical direction in the three-dimensional space, even if a display form of a three-dimensional space image changes following the movement of the line of sight I.

Figure 4:
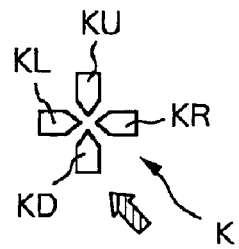
FIG. 4 illustrates relations between operation forms and movement directions of a character in this embodiment.
Figure 4:
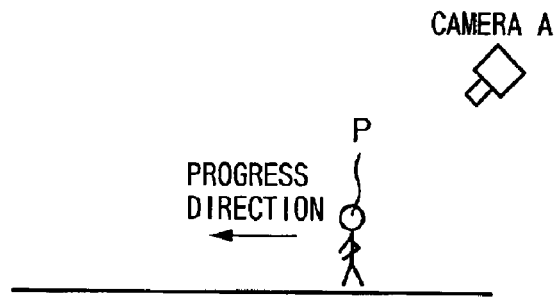
Figure 4:
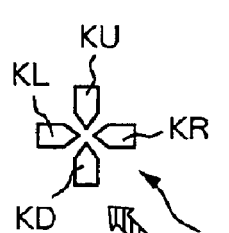
Figure 4:
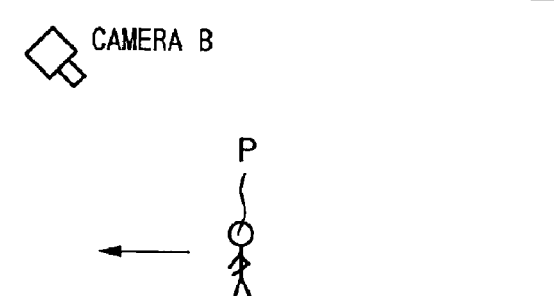

That is, for example, as shown in FIG. 4, it is assumed that there is a case in which an image displayed on a screen in a game progress process is switched from a three-dimensional space image (a) photographed by a virtual camera A from the back of the player character P to a three-dimensional space image (b) photographed by a virtual camera B from the front of the player character P. At this point, since the progress direction (←) of the character is a direction going away from the camera A in the three-dimensional space image (a), the player is operating the down key part KD in the direction key.

In this operation state, when the three-dimensional space image is switched to the three-dimensional space image from the camera B, the progress direction (←) of the player character P turns into a direction approaching the camera B in the three-dimensional space image. However, if the operation with respect to the down key part KD continues in the direction key 31, the progress direction (←) of the player character P is continuously controlled in the identical direction in the three-dimensional space by the processing of step S7. Therefore, in order to move the player character P in the identical direction in the three-dimensional space before and after the camera is switched from A to B, it is sufficient that the operation with respect to the down key part KD simply continues.

Figure 6:
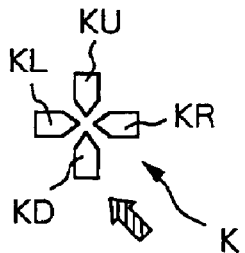
FIG. 6 illustrates relations between operation forms and movement directions of a character in the prior art.

Thus, it is not necessary to stop the operation of the down key part KD and operate the up key part KU in an attempt to move the player character P in a direction approaching the camera B as in the prior art, shown in FIG. 6. As a result, even if a virtual three-dimensional space image to be displayed on the screen changes, a smooth movement of the character in the identical direction is possible without operating the direction key anew. Thus, the amusement value of the video game can be increased.

Then, if the operation with respect to the key part of the identical direction is stopped in the direction key 31 (step S6; NO), the CPU 8 determines whether or not a game is finished (step S8) and, if the game is continued, returns to step S1 to detect the angle θ.

Further, although the case in which the present invention is realized with a game machine for home use as a platform is described in this embodiment, the present invention may be realized with a general-purpose computer such as a personal computer or an arcade game machine as a platform.

Moreover, a program and data for realizing the present invention are stored in a CD-ROM, which is used as a recording medium in this embodiment. However, a recording medium is not limited to a CD-ROM and may be a DVD (Digital Versatile Disc), other computer readable magnetic and optical recording media or a semiconductor memory. Furthermore, a program and data for realizing the present invention may be provided in the form of being preinstalled in a storage device of a game machine or a computer in advance.

In addition, a program and data for realizing the present invention may be downloaded from another apparatus on the network 17 connected by the communications interface 15, shown in FIG. 1, via the communications line 16 to the HDD 10 and used. In addition, the program and the data may be recorded in a memory on another apparatus side on the communications line 16 and sequentially stored in the RAM 9 if necessary via the communications line 16 and used.

In addition, a form of providing a program and data for realizing the present invention may be such that the program and the data are provided as a computer data signal superimposed on a carrier wave from another apparatus on the network 17. In this case, another apparatus on the network 17 is requested from the communications interface 15 via the communications line 16 to transmit the computer data, and the transmitted computer data signal is received and stored in the RAM 9. It is also possible to realize the present invention in the game apparatus 1 using the program and the data stored in the RAM 9 in this way.

As described above, according to the present invention, if an identical direction is continuously input from a direction key, even if a display form of a three-dimensional space image changes following movement of a line of sight, it is possible to continue to cause a character to move in the identical direction in the three-dimensional space. Thus, even if a display form of a virtual three-dimensional space to be displayed on a screen changes, a smooth movement of a character in the identical direction is possible without operating the direction key anew. Consequently amusement provided by the video game can be increased.

The present invention is not limited to the above embodiments and various changes and modifications can be made within the spirit and scope of the present invention. Therefore, to apprise the public of the scope of the present invention the following claims are made.

What is claimed is:

1. A recording medium having recorded thereon a video game program for causing a computer to execute a video game for displaying a virtual three-dimensional space while causing a line of sight to change and at the same time displaying a character on a screen and causing said character to move in said three-dimensional space based on a direction input by a direction key operated by a player, wherein the video game program causes a computer to execute:

a generating procedure that, when said direction key is operated by the player, corrects said input direction by an angle to generate a corrected direction as a progress direction of said character in said three-dimensional space;

a first character movement controlling procedure that moves said character in said progress direction in said three-dimensional space;

a storing procedure that stores said progress direction;

a determining procedure that determines whether an identical direction is input from said direction key continuously; and a second character movement controlling procedure that, when it is determined that an identical direction is input from said direction key continuously, moves said character in said stored progress direction in said three-dimensional space regardless of movement of said line of sight.

2. A method of controlling movement of a character in a video game for displaying a virtual three-dimensional space while causing a line of sight to change and at the same time displaying a character on a screen and causing said character to move in said three-dimensional space based on a direction input by a direction key operated by a player, comprising:

correcting, when said direction key is operated by the player, said input direction by an angle to obtain a corrected direction as a progress direction of said character in said three-dimensional space;

moving said character in said progress direction in said three-dimensional space;

storing said progress direction of said character;

determining whether an identical direction is input from said direction key continuously; and moving, when it is determined that the identical direction is input from said direction key continuously, said character in said stored progress direction in said three-dimensional space regardless of movement of said line of sight.

3. A game apparatus for displaying a virtual three-dimensional space while causing a line of sight to change and at the same time displaying a character on a screen and causing said character to move in said three-dimensional space based on a direction input by a direction key operated by a player, comprising:

a generator that, when said direction key is operated by the player, corrects said input direction by an angle to generate a corrected direction as a progress direction of said character in said three-dimensional space;

a first character movement controller that moves said character in said progress direction in said three-dimensional space;

a storage that stores said progress direction of said character;

a determining system that determines whether an identical direction is input from said direction key continuously; and a second character movement controller that, when it is determined that the identical direction is input from said direction key continuously, moves said character in said progress direction stored in said storage in said three-dimensional space regardless of movement of said line of sight.

* * * * *